Figure 1:
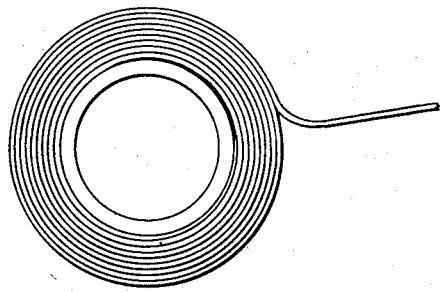

April 14, 1959     H. M. BOND ET AL     2,882,183
SILICONE PRESSURE-SENSITIVE ADHESIVE TAPE
Filed May 21, 1956

INVENTORS
HERBERT M. BOND
GAYLORD L. GROFF
BY
Carpenter, Abbott, Coulter, & Kinney
ATTORNEYS

2,882,183

SILICONE PRESSURE-SENSITIVE ADHESIVE TAPE

Herbert M. Bond, St. Paul, and Gaylord L. Groff, Roseville, Minn., assignors to Minnesota Mining and Manufacturing Company, St. Paul, Minn., a corporation of Delaware Application May 21, 1956, Serial No. 586,274

6 Claims. (Cl. 117—68.5)

This invention relates to high temperature resistant pressure-sensitive adhesive tapes, and particularly to adhesive products comprising silicones.

Pressure-sensitive adhesive tape products have found widespread use as electrical insulation, in splicing, wrapping, holding and similar operations in the manufacture of electrical coils, motors, transformers, cables, etc. In many cases, temperature is only a minor factor, and conventional materials may be employed in the construction of the adhesive tape products. More recently there has been a necessity for high temperature resistant materials, to permit operation of electrical components at high temperatures, thus decreasing the space requirements and improving the general operating characteristics of the electrical equipment involved.

Silicone materials, i.e., polymers of organic siloxanes, are known to be highly heat resistant. In various forms, these materials may be resinous or rubbery, and certain compositions or mixtures have also been developed which are found to have properties of pressure-sensitive tape adhesives. The substitution of such materials for the more conventional combinations of natural rubber and resins in the production of high temperature resistant pressure-sensitive tape adhesives and backings is therefore indicated. It has been found, however, that tape formed from a layer of silicone base pressure-sensitive tape adhesive and a layer of silicone elastomeric material such as might be employed in a film or unified fibrous backing, rapidly deteriorates during periods of storage in roll form. For example, a coating of silicone base pressure-sensitive adhesive on a backing composed of glass cloth impregnated with a non-tacky silicone elastomer frequently becomes soft and low in cohesive strength when the tape product is stored in roll form. In other instances, employing different specific adhesive and backing materials, the initial tackiness of the adhesive completely disappears after a short aging period in the roll.

Attempts have been made to avoid the aforementioned difficulties by winding the tape product on a carrier or separator strip which prevents contact in the roll between the adhesive surface and the back surface of the backing material, and which is removed and discarded as the tape is used. In addition to being expensive, this procedure still does not provide protection against loss of adhesive properties in the adhesive layer when the tape is wound upon itself in the protection of splices or in other use applications. Further it introduces other problems in handling the tape and is not considered by most users to be a satisfactory solution to the problem.

Another system which has been suggested is the application of so-called low adhesion backsize materials to the back surface of the backing. A number of different materials, e.g. shellac and various cellulosic lacquers, are well known in the adhesive tape art for use as low adhesion backsizes. These materials, however, are not resistant to higher temperatures such as those at which silicones are operable, and therefore are not desired for use in making superior heat-resistant tapes. In addition, many of these materials have been found to be inadequate for the intended purpose when applied to tape backings based on silicone elastomers and in contact with pressure-sensitive tape adhesives based on silicone polymers and mixtures. Usually the backsize material does not adhere well to the back surface; or it does not provide a low adhesion contact surface for the pressure-sensitive adhesive; or it permits migration of low molecular weight materials between the adjacent adhesive and backing surfaces; or the structure fails for some other reason.

Another proposed solution to the problem has been to coat the backing of silicone adhesive tapes with certain organic titanates. These coatings, however, have not been found to be fully effective. Silicone pressure-sensitive adhesive layers in direct contact with these backing coatings have been noted to lose tack and delaminate or transfer upon unwinding after a short period of aging in roll form.

Prior to the present invention, therefore, no one to our knowledge has found an acceptable commercial means for providing in roll form a storable heat-resistant pressure-sensitive adhesive tape product having a silicone backing and a silicone adhesive in which the functional adhesive surface is permitted to remain in direct contact with the outer back surface of the backing.

The present invention therefore provides for a new and useful product in the nature of a pressure-sensitive adhesive tape having a silicone backing and a silicone pressure-sensitive adhesive, the structure requiring no interliner but being wound in roll form with the adhesive surface in direct contact with the outer back surface of the backing. The tape product has excellent storage life in roll form. The tape may be unwound from the roll without splitting or offsetting of the adhesive. The tackiness or adhesion value of the adhesive surface is maintained even after prolonged storage in the roll. The tape possesses a suitable amount of adhesive grab between the back surface of its backing and its adhesive layer, so that it may be conveniently and easily unwound from roll form in lengths as desired while holding on a substrate material during application. It may be applied to any of various substrate materials such as electrical cables, coils, etc., and adheres well to the substrate as well as satisfactorily to its own backing when overlapped thereon. An excellent bond and tight seal between overlapped layers can be formed by heating the same to elevated temperatures, e.g., 500° F. for three hours.

These and other advantages are obtained by applying to the back surface of the silicone or silicone-treated backing a firmly adherent low-adhesion backsize barrier coating which itself consists largely of silicone resin, and then heat-curing the latter on the surface of the backing.

It has been empirically discovered that a combination of certain silicone resins and curing agents therefor provides not only a suitable inert flexible back-sized surface for stable contact with silicone pressure-sensitive adhesives, but also produces a high degree of adhesive bonding between the cured coating and the silicone elastomer backing to which the coating is applied.

Curing of the coating in situ upon the elastomer backing is particularly important. Calendering of a previously cured flexible film of the backsize resin upon a previously formed silicone elastomer backing has not been found to be effective. Adhesion of such a resin layer to an underlying elastomer layer is at best poor and much of the resin layer transfers to the surface of the pressure-sensitive adhesive when a tape so formed is stored in roll form. Surprisingly, however, an in situ heat-cured film of silicone resin adheres well to a silicone elastomer backing, even though it appears doubtful that a chemical interaction between the resin film and elastomer layer is effected during the step of in situ curing, inasmuch as curing agents employed to cure the silicone resin are not known to be effective as agents for curing silicone elastomers. Furthermore, the resin should be applied to the silicone elastomer backing with the curing catalyst either spread over the backing prior to film coating the resin, or with the curing catalyst present in the resin mass that is applied, if desired smooth uniform backing films of the backsize composition are to be readily obtained. Application of these resins to silicone elastomer backings without a curing catalyst present results almost invariably in a mottled coating of generally unsatisfactory performance properties.

The structure of tape of this invention is illustrated in the drawings.

Figure 1 is a side elevation of a roll of tape.

Figure 2:

Figure 2 is an enlarged side elevation of a portion of tape having a pressure-sensitive layer 10, a silicone elastomer backing 11, and a silicone resin backsize layer 12.

Figure 3:
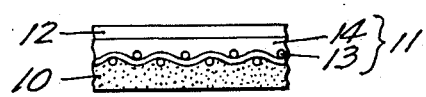

Figure 3 is an enlarged side elevation illustrating a structure analogous to that of Figure 2 except that the backing 11 comprises a glass fabric 13 coated with a silicone elastomer layer 14.

Figure 4:
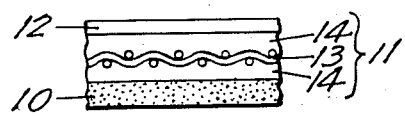

Figure 4 likewise is an enlarged side elevation illustrating a structure analogous to that of Figure 2 except that the backing 11 comprises a glass fabric 13 impregnated and coated upon both sides with a silicone elastomer 14.

The following examples, in which all parts are indicated as parts by weight unless otherwise specified, are intended to illustrate but not to limit the features and principles of this invention.

*Example 1*

Glass cloth (Hess-Goldsmith HG–16 woven glass cloth) was impregnated and coated on both sides by dipping the same in a xylene dispersion (33% solids) of 100 parts of a high viscosity dimethyl siloxane polymer, commercially available from General Electric as "SE–76," 50 parts of powdered inert calcium carbonate filler ("Witcarb"), 3 parts of tetraethoxy silicate, and 2 parts of benzoyl peroxide as a curing agent for the polymer. The coating was dried at 125° to remove the xylene, and heated to 250° C. for 5 to 10 minutes to vulcanize the silicone polymer. The tetraethoxy silicate improved the coatability of the dispersion but is probably hydrolyzed during vulcanization and thereafter functions only as a filler for the elastomeric backing.

A thin film of a xylene dispersion (30% solids) of a hard, brittle, light-straw colored silicone resin (Dow Corning XR5061), containing 1% triethanolamine catalyst based on the weight of resin, was applied on one side of this backing at a thickness sufficient to give a dry coating weight of about 2 grains per 4" x 6" area of backing. The xylene-soluble resin employed had a ratio or organic groups to silicon atoms of 1.3 to 1, a ratio of methyl to phenyl radicals of about 1 to 2, contained about .96% by weight silicon bonded hydroxyl groups, and may be formed, according to well-known prior art teachings, which constitute no part of this invention.

After the resin mixture was applied, the solvent was evaporated from the coating by heating for 5 minutes at 100° C., and the coating cured and anchored to the backing by heating for 10 minutes at 260° C. The resin formed a smooth continuous adherent backsize coating.

On the side of the backing opposite the backsize layer was knife coated a solution of a silicone pressure-sensitive adhesive, defined hereinafter, dispersed (40% solids) in a volatile petroleum hydrocarbon solvent and containing 1.5% benzoyl peroxide based on adhesive solids. The coating was sufficiently thick to provide a dry coating weight of 20 grains per 4" x 6" of backing. The structure was heated to 100° C. for 5 minutes to evaporate the solvent and thereafter heated for 15 minutes at 150° C. to partially cure the adhesive.

The initial adhesion to steel of this tape was found to be 20 ounces per inch width as measured according to ASTM D 1000. In this test a 1" strip of tape applied to a steel panel is stripped back over itself (i.e., pulled from the steel surface at a 180° angle) at a steady rate of 12 inches per minute. After accelerated aging in roll form for 7 days at 150° F., the tape of this example was easily unwound without delamination or offsetting and its adhesion to steel according to the foregoing test was still high, being 17 ounces per inch width. It had excellent flexural strength, high dielectric strength and good dielectric properties. The backsize coating remained firmly united with the surface of the backing material and did not transfer or otherwise interfere with the pressure-sensitive characteristics of the adhesive surface.

The adhesive layer of a similar tape product prepared exactly as outlined above except that the backsize resin composition was omitted, became so pasty after three days at room temperature in contact with the silicone elastomer backing that it split upon unwinding of the tape from a roll, and exhibited little or no adhesion.

*Example 2*

A silicone backing composition was formed by milling together the following constituents on a rubber mill until a uniform blend was obtained: 100 parts dimethylsiloxane gum (Dow Corning Silastic 400 gum), 30 parts of finely divided silica filler, 20 parts of a diatomaceous earth ("Celite Super Floss"), and 2 parts of benzoyl peroxide. The milled composition was extruded as a 20-mil film upon one side of a temporary glass cloth carrier, i.e., a glass cloth of the type used in Example 1, and heated for 2 minutes at 280° C. to effect substantial curing.

Over the extruded film, while supported by the glass cloth, was squeeze roll coated a thin film, sufficiently thick to give a smooth uniform coating, of a backsize composition comprising a toluene dispersion (35% solids), of a silicone resin and 1% lead octoate curing catalyst based on the weight of the resin solids. The resin was a soft, sticky, amber silicone resin (General Electric SR 17) having a ratio of organic groups to silicon atoms of about 1.4 to 1, a ratio of methyl to phenyl radicals of about 1.4 to 1, and containing in the general neighborhood of 0.75% by weight of silicon atom bonded hydroxyl groups. This resin coating was heated for 5 minutes at 100° C. to remove the toluene solvent and then was cured for 10 minutes at 260° C.

Directly over the backsize coating on the silicone elastomer backing, while the structure was supported on the glass cloth, was knife coated a pressure-sensitive adhesive layer of a type and thickness as used in Example 1. The adhesive coating was then dried 5 minutes at 100° C. and partially cured for 15 minutes at 150° C.

The structure resulting from the foregoing steps comprises, from bottom to top, a temporary glass cloth support, a silicone elastomer layer, a cured resin film and a silicone pressure-sensitive adhesive layer. The top three layers of this structure were wound onto a core in roll form while the glass cloth support was simultaneously stripped therefrom, the result being a roll of very flexible and stretchable tape free of the glass cloth support. During winding of the tape into roll form, the adhesive layer was placed in direct contact with the side of the silicone elastomer backing material free of the cured resin backsize. On unwinding, the adhesive was found to have transferred into adherent firm contact with the untreated side of the silicone elastomer backing free of the backsize resin.

This tape is very elastic and conformable and can be used to form a very tight seal. An excellent thermoset bond between overlapped layers of the tape wrapped around a splice or other structure can be formed by heating the same to elevated temperatures, e.g., 500° F. for 3 hours.

Accelerated aging tests on this tape, i.e., 2 weeks at

150° F., left it still in condition to be easily unwound with no adhesive splitting and with little or no loss of tack. A similar roll of tape prepared exactly as outlined above, except that the application of the backsize resin and heating steps therefor were omitted, was so strongly bonded together after 3 days at room temperature that it ruptured on unwinding.

*Example 3*

In two separate operations, the following previously milled composition was calendered at a 3 mil thickness upon each side of glass cloth of the type used in Example 1: 100 parts of high viscosity dimethylsiloxane polymer (General Electric "SE-76"), 30 parts of a finely divided silica filler, 20 parts of a diatomaceous earth ("Celite Super Floss"), 3 parts of red iron oxide ("Mapico Red"), and 2 parts benzoyl peroxide. After each operation, the applied calendered coating was vulcanized for 2 minutes at 280° C.

Upon one side of the resulting tape backing was painted a thin film-forming coating of a backsize composition dispersed in xylene at a concentration of 35% solids, the backsize composition being a light amber silicone resin (Dow Corning "XR 538") containing 3% tetrabutyl titanate catalyst based on the resin solids. This resin had an approximate ratio of organic radicals to silicon atoms of 1.7 to 1, a ratio of methyl to phenyl groups of about 2.3 to 1, and contained only a minute quantity of silicon atom bonded hydroxyl groups. The coating was dried, i. e., the xylene evaporated, at 100° C. for 5 minutes and cured for 10 minutes at 260° C.

Upon the other side of the backing, a pressure-sensitive adhesive of the type used in Example 1 was applied using also the procedure set forth in that example. This tape was also wound up in roll form and tested. It had very good adhesion to metal surfaces, excellent shelf life, and could be readily unwound from roll form without adhesive delamination or offsetting, yet adhered well to substrate materials as well as to its own backing when overlapped thereon in use applications.

Various tough and rubbery silicone elastomers are useful as flexible backings for tapes of this invention, such elastomers being usually formed from polymers which contain a large proportion of diorganosiloxane units. Elastomers formed predominately of dimethylsiloxane units are preferred, but those which contain small percentages of vinyl, tolyl, benzyl, allyl, etc., or somewhat larger amounts of phenyl or related groups are also very useful. Diorganopolysiloxane elastomers generally have a ratio of organic groups to silicon atoms between about 1.98 to 1 and 2.02 to 1. Such elastomers are further disclosed and defined in such United States patents as, for example, 2,723,964, and 2,732,318. It may be noted that polymers useful in forming the tough elastomer backing may be cured by heating in the presence of peroxide catalysts, by high energy ionizing irradiation, etc. The resulting cured polymer is flexible, tough, rubbery and highly resistant to breakdown at elevated temperatures.

Various fillers and other materials may be incorporated in an organopolysiloxane elastomer backing, or equivalent, to gain desired or intended results, e.g., coloration, improved tensile strength, etc., without departing from the scope of this invention. Reinforcing materials, including woven sheet materials such as glass cloth, asbestos, nylon, etc., may be used as part of a backing, also to impart properties as desired to the tape.

Suitable pressure-sensitive silicone adhesives for the practice of this invention are those which comprise a mixture of between about 5 and 70% by weight of benzene soluble resinous silicone polymers which are compatible with silicone elastomers, and between about 95 and 30% by weight of benzene soluble rubbery polymeric silicone elastomers. The polymeric resin component in such a mixture contains both $SiO_2$ units and $R_3SiO_{.5}$ units, where R is an alkyl radical of less than 4 carbon atoms or a phenyl radical, and where the ratio of $R_3SiO_{.5}$ units to $SiO_2$ units is from 0.6:1 to 0.9:1 inclusive. The elastomeric silicone component is a diorganosiloxane having a viscosity of at least 1,000,000 centistokes at 25° C., and having the general formula $R'_2SiO$, where R' is a methyl or phenyl radical. Of the total number of R and R' radicals in each of the resin and elastomer, at least about 90% are alkyl. A typical example of a silicone pressure-sensitive adhesive composition is one consisting of 50 parts of a copolymer composed of $(CH_3)_3SiO_{.5}$ units and $SiO_2$ units having a general average of about 1.2 methyl units per silicon atom, 50 parts of a dimethylsiloxane polymer having a viscosity in excess of 10,000,000 cs. at 25° C., and about 2.5 parts of benzoyl peroxide as a curing agent.

The foregoing is intended solely as illustrative of the organopolysiloxane pressure-sensitive adhesives which may be used in the practice of this invention. Other silicone adhesives which are pressure-sensitive at room temperature, which adhere well, either directly or through anchorage treatment, to tape backings, and which in other respects are equivalent to the foregoing pressure-sensitive organopolysiloxane mixtures, are also contemplated as useful. Fillers and various curing agents may be included in the adhesive mass as well known in the art.

Xylene soluble organopolysiloxane resins useful in combination with catalytic curing agents to provide the in situ formed tack-free, xylene insoluble, barrier backsize film of the invention are those which, among other things, characteristically have a ratio of monomeric organic radicals to silicon atoms between 1:1 and 1.8:1. The organic radicals in the resin polymer may vary considerably and may include any of the following, or combinations thereof: alkyl radicals averaging less than 6 carbon atoms, e.g., methyl, ethyl, etc., alkenyl radicals averaging less than 6 carbon atoms, e.g., vinyl, allyl, etc., aryl radicals, e. g., phenyl, tolyl, xylyl, naphthyl, etc., and cycloaliphatic radicals, e.g., cyclohexyl, etc.

These resins also contain at least 0.01% by weight and up to about 8% by weight, or slightly higher, of silicon atom bonded hydroxyl groups.

or equivalent groups, such as groups which can be hydrolyzed to give silicon atom bonded hydroxyl groups. Examples of such equivalent groups are:

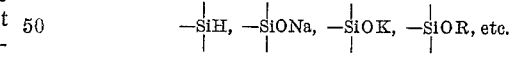

R being an organic radical. These groups may or may not actually be hydrolyzed during curing of the resin using such catalytic curing or condensation agents as, for example, organo-metallic salts, triethanolamine, etc.; however, it has been noted that when these groups replace silicon bonded hydroxyl groups in a resin, substantially equivalent results are obtained. Resins which contain silicon bonded hydroxyl groups are, however, more readily available commercially, give excellent results as taught herein, and are preferred.

Most of the silicon atoms in the resins of this class are bonded to less than 3 organic radicals. In other words, $R_3SiO_{.5}$ units where R is an organic radical, are not present in these resins in an amount over 10% by weight, and usually the possible amount of such terminal groups in these resins is much lower, whereas tackifier silicone resins for adhesives contain such groups in an amount well in excess of 10% by weight.

Further, silicone resins suitable for backsize application are soluble in xylene at room temperature without gelation (provided they are free of catalytic curing agents), are of intermediate molecular weight, and can be catalytically cured into xylene insoluble products by heating in the presence of catalytic curing agents, apparently with extensive cross-linking through reactive silicon bonded hydroxyl or equivalent groups in the resin.

Silicone resins which satisfy the requirements aforenoted, and which, when dissolved or dispersed in an organic solvent with a catalytic curing agent, may be coated in a uniform layer upon a rubbery silicone elastomer and thereafter cured in situ to form a continuous non-tacky film highly adherent to the silicone elastomer (which film remains in place upon flexing), may also contain in their mass various amounts of compounds such as, for example, purely organic polymers, or inorganic or organic pigments, and further, may contain small amounts of chemically bonded radicals other than those aforespecified, provided such amounts in each case do not seriously affect the required backsize properties of the in situ cured resinous film.

Various catalytic curing agents may be employed to cure these resins. These curing agents are polyfunctional, containing more than one possible reaction group, and are hydroxyl-reacting, causing polymerization, including cross-linking, of the backsize xylene soluble silicone resins through polymer joining sites which are created at sites of silicon bonded hydroxyl or equivalent groups in the resins. Polymerization of resins through sites of silicon bonded hydroxyl groups, or equivalent, is not definitely understood, although suggestions are that it involves a chemical reaction in which the catalytic curing agent, or part thereof, becomes an integral part of the resulting cured polymer (see for example the discussion in U.S. Patent 2,410,737 to Jenny). It may also proceed in such manner as to leave the catalytic curing agent relatively unaffected, causing resin chains to join through hydroxyl groups, or equivalent, by elimination of water, weak acids, alkalis, or the like, to form a siloxane crosslink

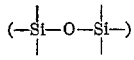

In all cases, however, the curing agent suitable to employ is capable of effecting polymerization of the resin through silicon atom bonded hydroxyl, or equivalent, groups. Regardless of theory, the combination of catalytic curing agents and hydroxyl-containing silicone polymer as here identified, when applied and thermoset as indicated, has been found to result in pressure-sensitive adhesive tape products having the desired high temperature resistance, long aging capabilities, and other properties as here described.

A partial list of catalytic curing agents suitable to employ to gain the results indicated includes tetrabutyl titanate, tetraisopropyl titanate, lead octoate, zinc octoate, cobalt naphthenate, triethanolamine, etc. To those skilled in the art, others will readily suggest themselves, and new catalysts which are discovered and which function as required to give the results taught herein will also be found useful.

The amount of catalytic curing agent used to effect in situ heat-curing of a resin will vary depending upon the particular resin and agent combination chosen. If too little of a particular catalyst is used, curing of the backsize coating will be noted to be insufficient since the coating, during application and cure, will become mottled and discontinuous, leaving portions of the back surface of the silicone elastomer uncovered and free of treatment. If an excess amount is employed in a resin coating solution, problems sometimes arise because of gelling of the resin-catalyst mixture before coating can be accomplished, and suitable coating films are difficult to form. In general, the useful range of catalyst concentration in the backsize composition may vary from about 0.5 to 5% by weight based on the weight of resin solids in the mixture, but the specific amount employed in a specific mixture is best determined by running a few tests taking note of the factors aforenoted. A layer applied at a uniform thickness and cured in situ in a uniform manner provides a low-adhesion backsized surface which usually possesses a smooth glossy appearance.

In situ curing is effected at elevated temperatures well above normal room temperature, e.g. usually above 100° C. While it is unnecessary to use higher temperatures than about 300° C. for curing, it is possible, although not desired, to use such higher temperatures for brief periods.

That which is claimed is:

1. A stable pressure-sensitive silicone adhesive sheet material, the pressure-sensitive adhesive surface of which retains its pressure-sensitive adhesive properties after prolonged storage in direct contact with the back surface of said sheet material, said sheet material comprising a backing including a layer of a flexible silicone elastomer, a pressure-sensitive silicone adhesive firmly adherently bonded to one side of said backing, and a non-tacky barrier backsize film firmly adherently bonded to the other side of said backing, said backsize film comprising an in situ heat-cured mixture of components comprising a silicone resin and a catalytic curing agent which promotes polymerization of said resin through silicon bonded hydroxyl groups thereof, said silicone resin being an organopolysiloxane in which the ratio of monovalent organic radicals to silicon atoms is between 1:1 and 1.8:1, the weight percent of silicon bonded hydroxyl groups is at least 0.01, and the weight percent of $R_3SiO_{.5}$ groups, where R is an organic radical, is less than 10.

2. A stable silicone pressure-sensitive adhesive tape comprising a backing including a layer of a flexible silicone elastomer, a non-tacky silicone barrier backsize film on one side of said backing, and a pressure-sensitive silicone adhesive firmly adherently bonded to the opposite side of said backing, and with the functional adhesive surface in direct contact with the backsized surface of said backing and in permanent stable equilibrium therewith while in roll form, said backsize film comprising an in situ heat-cured mixture of components comprising a silicone resin and a catalytic curing agent which promotes polymerization of said resin through silicon bonded hydroxyl groups thereof, said silicone resin being an organopolysiloxane in which the ratio of monovalent organic radicals to silicon atoms is between 1:1 and 1.8:1, the weight percent of silicon bonded hydroxyl groups is between about 0.01 and 8, and the weight percent of $R_3SiO_{.5}$ groups, where R is an organic radical, is less than 10.

3. A stable silicone pressure-sensitive adhesive tape comprising a backing including a layer of a flexible silicone elastomer, a non-tacky silicone barrier backsize film on one side of said backing, and a pressure-sensitive silicone adhesive firmly adherently bonded to the opposite side of said backing, and with the functional adhesive surface in direct contact with the backsized surface of said backing and in permanent stable equilibrium therewith while in roll form, said backsize film comprising an in situ heat-cured mixture of components comprising a silicone resin and a catalytic curing agent which promotes polymerization of said resin through silicon bonded hydroxyl groups thereof, said silicone resin being an organopolysiloxane in which the ratio of monovalent organic radicals to silicon atoms is between 1:1 and 1.8:1, said organic radicals being selected from the group consisting of alkyl radicals averaging less than 6 carbon atoms, alkenyl radicals averaging less than 6 carbon atoms, aryl radicals, cycloaliphatic radicals, and mixtures thereof, and in which the weight percent of silicon bonded hydroxyl groups is between about 0.01 and 8, and the weight percent of $R_3SiO_{.5}$ groups, where R is an organic radical, is less than 10.

4. A stable pressure-sensitive silicone adhesive sheet material, the pressure-sensitive adhesive surface of which retains its pressure-sensitive adhesive properties after prolonged storage in direct contact with the back surface of said sheet material, said sheet material comprising a backing including a layer of a flexible silicone elastomer, a pressure-sensitive silicone adhesive firmly adherently bonded to one side of said backing, and a non-tacky barrier backsize film firmly adherently bonded to the other side of said backing, said backsize film comprising an in situ heat-cured mixture of components comprising a silicone resin and a catalytic curing agent which promotes polymerization of said resin through silicon bonded hydroxyl groups thereof, said silicone resin being an organopolysiloxane in which the ratio of monovalent organic radicals to silicon atoms is between 1:1 and 1.8:1, said organic radicals being selected from the group consisting of alkyl radicals averaging less than 6 carbon atoms, alkenyl radicals averaging less than 6 carbon atoms, aryl radicals, cycloaliphatic radicals, and mixtures thereof, and in which the weight percent of silicon bonded hydroxyl groups is between about 0.01 and 8, and the weight percent of $R_3SiO_{.5}$ groups, where R is an organic radical, is less than 10.

5. The sheet material of claim 4 wherein the backing thereof includes a glass cloth layer.

6. A substantially non-stretchy stable silicone pressure-sensitive adhesive tape comprising a backing including a layer of glass cloth and a flexible silicone elastomer, a non-tacky silicone barrier backsize film on one side of said backing, and a pressure-sensitive silicone adhesive firmly adherently bonded to the opposite side of said backing, and with the functional adhesive surface in direct contact with the backsized surface of said backing and in permanent stable equilibrium therewith while in roll form, said backsize film comprising an in situ heat-cured mixture of components comprising a silicone resin and a catalytic curing agent which promotes polymerization of said resin through silicon bonded hydroxyl groups thereof, said silicone resin being an organopolysiloxane in which the ratio of monovalent organic radicals to silicon atoms is between 1:1 and 1.8:1, said organic radicals being selected from the group consisting of alkyl radicals averaging less than 6 carbon atoms, alkenyl radicals averaging less than 6 carbon atoms, aryl radicals, cycloaliphatic radicals, and mixtures thereof, and in which the weight percent of silicon bonded hydroxyl groups is between about 0.01 and 8, and the weight percent of $R_3SiO_{.5}$ groups, where R is an organic radical, is less than 10.

References Cited in the file of this patent

UNITED STATES PATENTS

| | | |
|---|---|---|
| 2,410,737 | Jenny | Nov. 5, 1946 |
| 2,588,367 | Dennett | Mar. 11, 1952 |
| 2,732,318 | Keil | Jan. 24, 1956 |
| 2,789,155 | Marshall et al. | Apr. 16, 1957 |